US009811921B2

(12) United States Patent
Zhao et al.

(10) Patent No.: US 9,811,921 B2
(45) Date of Patent: Nov. 7, 2017

(54) APPARATUS AND METHOD FOR PROCESSING A DEPTH IMAGE

(71) Applicant: BOE TECHNOLOGY GROUP CO., LTD., Beijing (CN)

(72) Inventors: Jibo Zhao, Beijing (CN); Xingxing Zhao, Beijing (CN); Xiaoli Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/026,870

(22) PCT Filed: Nov. 5, 2015

(86) PCT No.: PCT/CN2015/093867
§ 371 (c)(1),
(2) Date: Apr. 1, 2016

(87) PCT Pub. No.: WO2016/179979
PCT Pub. Date: Nov. 17, 2016

(65) Prior Publication Data
US 2017/0132803 A1    May 11, 2017

(30) Foreign Application Priority Data
May 11, 2015 (CN) .......................... 2015 1 0236717

(51) Int. Cl.
*G06K 9/00* (2006.01)
*G06T 7/564* (2017.01)
(Continued)

(52) U.S. Cl.
CPC .............. *G06T 7/564* (2017.01); *G06T 5/002* (2013.01); *G06T 7/11* (2017.01); *G06T 7/13* (2017.01);
(Continued)

(58) Field of Classification Search
CPC .. G06T 2207/10028; H04N 2013/0081; H04N 13/0271
See application file for complete search history.

(56) References Cited

U.S. PATENT DOCUMENTS 8,379,101 B2 * 2/2013 Mathe ................ G06K 9/00342
348/222.1
2014/0015830 A1 1/2014 Hong et al.
(Continued)

FOREIGN PATENT DOCUMENTS

CN        101465004      6/2009
CN        102750694      10/2012
(Continued)

OTHER PUBLICATIONS

Office Action from corresponding Chinese Application No. 201510236717.0, dated Mar. 13, 2017 (7 pages).
(Continued)

*Primary Examiner* — Eueng-Nan Yeh
(74) *Attorney, Agent, or Firm* — Harness, Dickey & Pierce, P.L.C.

(57) ABSTRACT

Embodiments of the present invention disclose method and apparatus for processing a depth image. The method comprises: obtaining the depth image and a captured image corresponding to the depth image; segmenting the depth image to obtain a plurality of segmentation units; calculating a corresponding depth reference value for each segmentation unit; determining a standard range of depth value for the each segmentation unit based on the corresponding depth reference value; and adjusting a depth value of each pixel of the depth image to the standard range of depth value corresponding to the segmentation unit in which the each pixel is located. The method and the apparatus of embodiments of the present invention can improve the quality of the depth image and cause the depth image to be easily identified.

20 Claims, 4 Drawing Sheets

(51) Int. Cl.
*G06T 7/11* (2017.01)
*G06T 7/149* (2017.01)
*G06T 7/13* (2017.01)
*G06T 5/00* (2006.01)
*H04N 13/02* (2006.01)

(52) U.S. Cl.
CPC ......... *G06T 7/149* (2017.01); *H04N 13/0239* (2013.01); *H04N 13/0257* (2013.01); *G06T 2207/10028* (2013.01); *G06T 2207/20152* (2013.01)

(56) References Cited

U.S. PATENT DOCUMENTS

| | | | |
|---|---|---|---|
| 2015/0036926 A1* | 2/2015 | Choi | G06T 5/003 382/167 |
| 2016/0096270 A1* | 4/2016 | Ibarz Gabardos | B25J 9/163 700/253 |
| 2016/0191908 A1 | 6/2016 | Yen et al. | |

FOREIGN PATENT DOCUMENTS

| | | |
|---|---|---|
| CN | 103136775 | 6/2013 |
| CN | 103455984 | 12/2013 |
| CN | 104581123 | 4/2015 |
| CN | 104835164 | 8/2015 |
| WO | 2010138434 | 3/2011 |

OTHER PUBLICATIONS

Chen et al., Depth Image Enhancement for Kinect Using Region Growing and Bilateral Filter, Nov. 2012, 5 pages.

Xu et al., A Novel Inpainting Algorithm for Kinect Depth Image, Nov. 2013, 6 pages.

* cited by examiner

APPARATUS AND METHOD FOR PROCESSING A DEPTH IMAGE

CLAIM OF PRIORITY

This application claims priority to China patent application number 201510236717.0, which was filed on May 11, 2015, the disclosure of which is incorporated by reference herein in its entirety.

TECHNICAL FIELD

The invention relates to an apparatus and method for processing a depth image.

BACKGROUND OF THE INVENTION

Currently, the commercially available mainstream motion sensing equipments, such as Kinect, Prime Sence, generally utilize a depth camera employing TOF (Time of Flight, time-of-flight method for imaging) principle to capture an image, and the captured image is then transmitted to a middleware such as NITE (it can implement functions such as gesture recognition, motion capture and so on), and the information about the skeleton and joints of a human body is obtained by software computing, consequently the move-enabled control can be performed.

There are also some other technologies for obtaining the depth image in addition to the utilization of TOF principle, for example, the utilization of binocular camera for obtaining the depth image is a solution with lower cost. The binocular camera, however, will cause the problems of certain information missing and stronger image noise due to the limitation of its imaging principle, thereby resulting in poor quality of the depth image. Therefore, there is a requirement for an improved solution of depth image processing.

SUMMARY OF THE INVENTION

There is provided a method for processing a depth image according to an aspect of the present disclosure. The method comprises: obtaining the depth image and a captured image corresponding to the depth image; segmenting the depth image to obtain a plurality of segmentation units; calculating a corresponding depth reference value for each segmentation unit; determining a standard range of depth value for the each segmentation unit based on the corresponding depth reference value; and adjusting a depth value of each pixel of the depth image to the standard range of depth value corresponding to the segmentation unit in which the each pixel is located.

The method of embodiment of the present invention can segment the depth image to obtain a plurality of segmentation units; calculate the corresponding depth reference value and the standard range of depth value for each segmentation unit; then traverse pixels of the depth image and adjust a depth value of a pixel to the standard range of depth value corresponding to the segmentation unit in which the pixel is located. It can perform de-noising processing on the depth image through this method, and the contour of the processed depth image is more clear and easy to identify. Therefore, it can improve the quality of the depth image.

According to an embodiment, the segmenting the depth image to obtain a plurality of segmentation units comprises: performing contour segmentation on the captured image to obtain contour segmentation information; and segmenting the depth image to obtain the plurality of segmentation units based on the contour segmentation information.

According to an embodiment, the performing contour segmentation on the captured image to obtain contour segmentation information comprises: performing gray processing on the captured image to obtain a gray image; performing edge extraction on the gray image to obtain a contour image; performing contour dilation processing on the contour image to obtain a contour dilation image; reversing the contour dilation image to obtain a reversed image; and calculating the contour segmentation information of the reversed image using the watershed algorithm.

The above embodiment can calculate the contour segmentation information of a real-time captured image in a shorter time, thereby facilitating the improvement of the processing speed of the de-noising processing on the depth image.

According to an embodiment, the calculating a corresponding depth reference value for each segmentation unit comprises: removing a black point pixel and a bright point pixel in the segmentation unit; counting the numbers of pixels with different depth values for the segmentation unit in which the black point pixel and the bright point pixel have been removed; and determining the depth value that the largest number of pixels have as the depth reference value for the segmentation unit.

The above embodiment can remove the black point pixel and the bright point pixel in the segmentation unit, i.e., removing noisy point pixels, thereby capable of improving the accuracy of the calculated results.

According to an embodiment, the standard range of depth value for the each segmentation unit is 0.5~1.3 times the depth reference value.

According to an embodiment, the adjusting a depth value of each pixel of the depth image to the standard range of depth value corresponding to the segmentation unit in which the each pixel is located, comprises: traversing a pixel of the depth image along a set direction, wherein in the traversing procedure, if the depth value of a current pixel is beyond the standard range of depth value corresponding to the segmentation unit in which the current pixel is located, then the depth values of surrounding pixels centering on the current pixel in the depth image may be sequentially read and spread outward the set number of loops; if a pixel currently being read is within the segmentation unit and its depth value is within the standard range of depth value corresponding to the segmentation unit, then it may quit the loop and the depth value of the current pixel is adjusted as the depth value of the pixel currently being read; if the set number of loops is finish and the depth value of the current pixel is not adjusted, then the depth value of the current pixel is adjusted as the depth reference value corresponding to the segmentation unit.

The above embodiment can cause the depth value transition of the adjusted pixel and its surrounding pixels to be relatively smooth, thereby facilitating the improvement of the quality of the processed depth image.

According to an embodiment, the surrounding pixels are located on the cross type direction of the current pixel.

The above embodiment can improve the speed of calculation process, thereby improving the speed of the de-noising processing on the depth image.

According to an embodiment, the set number of loops is five; and the set direction is from left to right or from right to left in row, or from up to down or from down to up in column.

The above embodiment can effectively fill on the pixels in a relatively short time with comparatively less amount of calculation, thereby facilitating the improvement of the speed of the de-noising processing on the depth image.

There is provided an apparatus for processing a depth image according to a second aspect of the present disclosure. The apparatus comprises: an obtaining module configured to obtain the depth image and a captured image corresponding to the depth image; a segmenting module configured to segment the depth image to obtain a plurality of segmentation units; a calculating module configured to calculate a corresponding depth reference value for each segmentation unit; a determining module configured to determine a standard range of depth value for the each segmentation unit based on the corresponding depth reference value; and an adjusting module configured to adjust a depth value of each pixel of the depth image to the standard range of depth value corresponding to the segmentation unit in which the each pixel is located.

According to an embodiment, the segmenting module is further configured to perform contour segmentation on the captured image to obtain contour segmentation information; and segment the depth image to obtain the plurality of segmentation units based on the contour segmentation information.

According to an embodiment, the segmenting module is further configured to: perform gray processing on the captured image to obtain a gray image; perform edge extraction on the gray image to obtain a contour image; perform contour dilation processing on the contour image to obtain a contour dilation image; reverse the contour dilation image to obtain a reversed image; calculate the contour segmentation information of the reversed image using the watershed algorithm.

According to an embodiment, the calculating module is further configured to remove a black point pixel and a bright point pixel in the segmentation unit; count the numbers of pixels with different depth values for the segmentation unit in which the black point pixel and the bright point pixel have been removed; determine the depth value that the largest number of pixels have as the depth reference value for the segmentation unit.

According to an embodiment, the standard range of depth value for the each segmentation unit is 0.5~1.3 times the depth reference value.

According to an embodiment, the adjusting module is further configured to traverse a pixel of the depth image along a set direction, wherein in the traversing procedure, if the depth value of a current pixel is beyond the standard range of depth value corresponding to the segmentation unit in which the current pixel is located, then the depth values of surrounding pixels centering on the current pixel in the depth image may be sequentially read and spread outward the set number of loops; if a pixel currently being read is within the segmentation unit and its depth value is within the standard range of depth value corresponding to the segmentation unit, then it may quit the loop and the depth value of the current pixel is adjusted as the depth value of the pixel currently being read; if the set number of loops is finish and the depth value of the current pixel is not adjusted, then the depth value of the current pixel is adjusted as the depth reference value corresponding to the segmentation unit.

According to an embodiment, the surrounding pixels are located on the cross type direction of the current pixel.

According to an embodiment, the set number of loops is five; and the set direction is from left to right or from right to left in row, or from up to down or from down to up in column.

The processing apparatus provided by the embodiments of the present invention can perform de-noising processing on the depth image, and the contour of the processed depth image is more clear and easy to identify. Therefore, it can improve the quality of the depth image.

BRIEF DESCRIPTION OF THE DRAWINGS

In order to illustrate the technique solution of embodiments of the present disclosure more clearly, reference will hereinafter be made to the accompanying drawings. It is obvious that the accompanying drawings in the following description are only related to some embodiments of the present disclosure and should not be construed as limited to the present disclosure.

DETAILED DESCRIPTION OF SPECIFIC EMBODIMENTS

To make those skilled in the art to better understand the objects, technical solutions and advantages of embodiments of the present disclosure, the technical solution of embodiments of the present disclosure will be described clearly and completely in connection with the accompanying drawings of embodiments of the present disclosure. It is obvious that the described embodiments are only some, but not all the embodiments of the present disclosure. All the other embodiments made by those of ordinary skill in the art without the premise of creative work belong to the scope of the disclosure.

Though the following embodiments are mainly discussed in the context of processing a depth image of binocular camera, it can be understood by those skilled in the art that the disclosure is not limited to this. Indeed, various embodiments of the disclosure can be applied to process any suitable depth image. For example, the depth image can be obtained from any other suitable imaging devices, or the depth image produced by other methods, and so on.

The embodiments of the present disclosure provide a method and an apparatus for processing a depth image. To make the objects, technical solution and advantages of embodiments of the present invention more clear, the embodiments of the present invention will be further described in detail.

Figure 1:
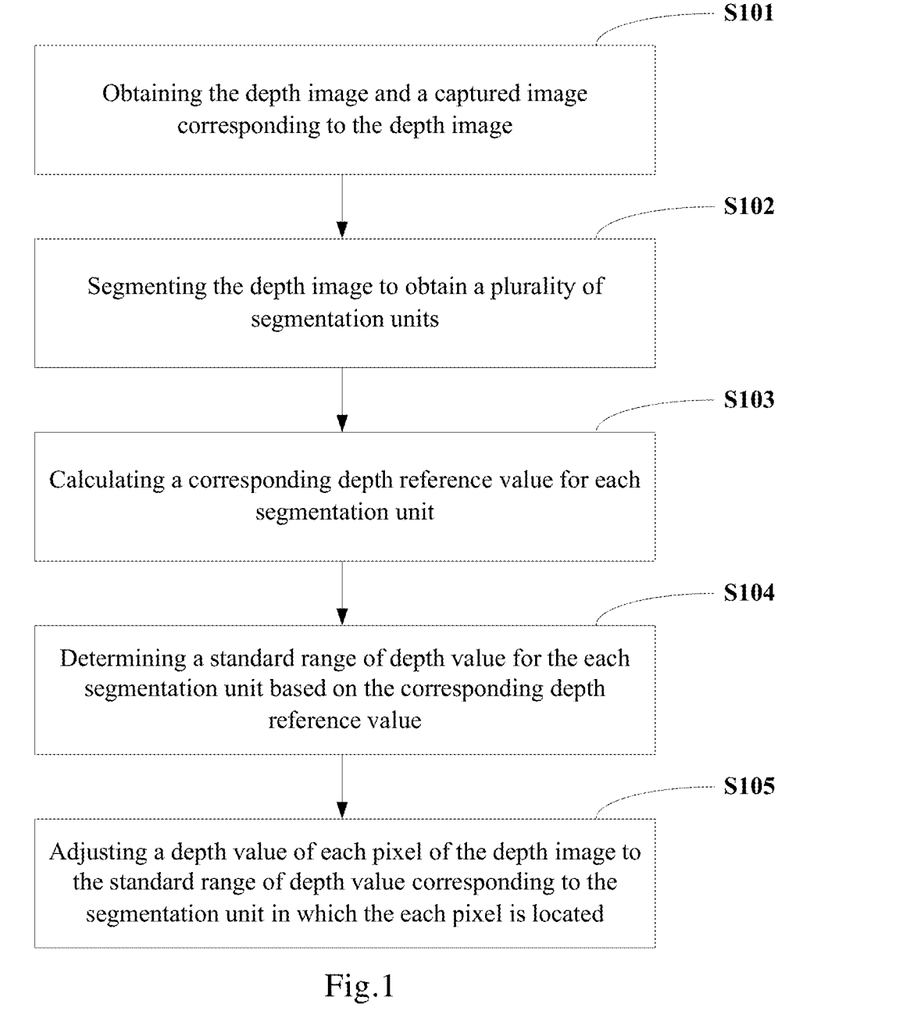
FIG. 1 shows a flowchart of a method for processing a depth image in accordance with an embodiment of the present invention.

As shown in FIG. 1, an embodiment of the present invention provides a method for processing a depth image, and the method comprises the following steps:

At step S101, obtaining the depth image and a captured image corresponding to the depth image;

At step S102, segmenting the depth image to obtain a plurality of segmentation units;

At step S103, calculating a corresponding depth reference value for each segmentation unit;

At step S104, determining a standard range of depth value for the each segmentation unit based on the corresponding depth reference value; and At step S105, adjusting a depth value of each pixel of the depth image to the standard range of depth value corresponding to the segmentation unit in which the each pixel is located.

At step S101, the depth image and the captured image can be obtained from a binocular camera or from other way, for example the depth image and the captured image can be that already obtained though any other suitable solution. The binocular camera comprises a primary camera and a secondary camera, wherein respective coordinate systems of the secondary camera and the primary camera have a certain positional deviation, and the control chip of the binocular camera can obtain the image of depth information in a space for a target body, i.e., the depth image, by computing. Normally, the depth image gathered by the binocular camera adopts a coordinate system consistent with the captured image by the primary camera. The images captured by both cameras of the binocular camera are generally RGB color images, but can also be any other suitable color images.

There are various ways to implement the segmentation of the depth image. In an embodiment, the step S102 may comprise:

performing contour segmentation on the captured image to obtain contour segmentation information; and segmenting the depth image to obtain the plurality of segmentation units based on the contour segmentation information.

As for the captured image of the primary camera, if in reality, a scope of each small contour corresponds to a same object or a same part of a certain object, the depth values within the scope should be close to each other. Therefore, it can perform contour segmentation on the captured image of the primary camera to obtain contour segmentation information, and then perform contour segmentation on the depth image based on the obtained contour segmentation information to obtain the plurality of segmentation units. In step S105, the "adjusting" can include refilling depth values on the pixels of the depth image.

There is no limit to the specific algorithms being adopted for performing contour segmentation on the captured image of the primary camera, for example it can adopt a pyramid segmentation algorithm, a mean shift segmentation algorithm, a watershed segmentation algorithm, etc. In an embodiment, considering that the motion sensing equipments should process the depth image generated in real-time in a shorter time (the contour segmentation and the pixel filling need to be completed within 30 ms), it may adopt the watershed segmentation algorithm.

Figure 2:
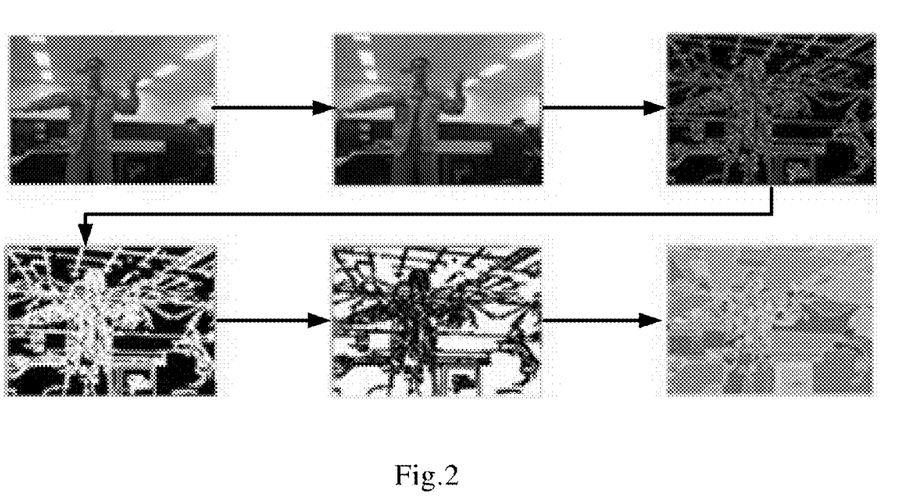
FIG. 2 shows a schematic diagram of performing contour segmentation on a captured image in accordance with an embodiment of the present invention.

In an embodiment of the present invention, step S102 may include the following substeps, as illustrated in FIG. 2:

performing gray processing on the captured image to obtain a gray image (i.e., the second image of FIG. 2);

performing edge extraction on the gray image to obtain a contour image (i.e., the third image of FIG. 2);

performing contour dilation processing on the contour image to obtain a contour dilation image (i.e., the fourth image of FIG. 2);

reversing the contour dilation image to obtain a reversed image (i.e., the fifth image of FIG. 2); and calculating the contour segmentation information of the reversed image using the watershed algorithm (i.e., the sixth image of FIG. 2).

The above method can calculate, in a shorter time, the contour segmentation information of the image captured by the primary camera in real-time, thereby facilitating the improvement of the processing speed of the de-noising processing on the depth image. Wherein, the contour segmentation information can include the contour location information and the coding information for a segmentation unit. It can adopt the canny edge extraction algorithm to perform edge extraction on the gray image. The canny edge extraction algorithm is a type of algorithm by which the image edge detection can by be fast realized, and the results obtained by the canny edge extraction algorithm is a binary image which has white contour lines and black background.

In an embodiment of the present invention, step S103 may include the following substeps:

removing a black point pixel and a bright point pixel in the segmentation unit;

counting the numbers of pixels with different depth values for the segmentation unit in which the black point pixel and the bright point pixel have been removed;

determining the depth value that the largest number of pixels have as the depth reference value for the segmentation unit.

In step S103, it may remove the black point pixel (for example, its depth value is 0) and the bright point pixel (for example, its depth value is 255) in the segmentation unit, i.e., removing noisy point pixels which have less credible, thereby improving the accuracy of the calculated results.

Figure 3:
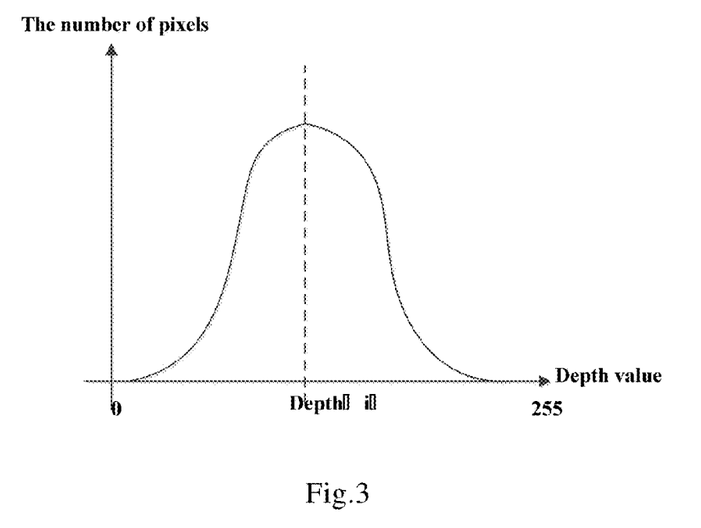
FIG. 3 shows a histogram of depth values and the numbers of pixels for a segmentation unit in accordance with an embodiment of the present invention.

As shown in FIG. 3, the depth reference value can be determined as follows: for the segmentation unit whose black point pixels and bright point pixels have been removed, generating a histogram where the abscissa is the depth value and the ordinate is the numbers of pixels for each depth value, and set the depth value that the largest number of pixels have as a corresponding depth reference value depth (i) of the segmentation unit.

In step 104, after calculating the corresponding depth reference value depth (i) of the segmentation unit, it can determine a standard range of depth value for the segmentation unit based on the corresponding depth reference value. Specifically, the standard range of depth value for the each segmentation unit is 0.5~1.3 times depth (i). Through plentiful statistical analysis, the inventor of the present application gets that the effective depth values for the same segmentation unit generally concentrate on the above range. Therefore, it can cause the processing results of the depth image to be more accurate by adopting the above range as the standard range of depth value to fill the pixels of the segmentation unit.

In an embodiment of the present invention, step S105 may include:

traversing a pixel of the depth image along a set direction, wherein in the traversing procedure:

if the depth value of a current pixel is beyond the standard range of depth value corresponding to the segmentation unit in which the current pixel is located, then the depth values of surrounding pixels centering on the current pixel in the depth image may be sequentially read and spread outward the set number of loops;

if a pixel currently being read is within the segmentation unit and its depth value is within the standard range of depth value corresponding to the segmentation unit, then it may quit the loop and the depth value of the current pixel is adjusted as the depth value of the pixel currently being read;

If the set number of loops is finish and the depth value of the current pixel is not adjusted, then the depth value of the current pixel is adjusted as the depth reference value corresponding to the segmentation unit.

Processing the depth image to obtain the processed depth image can be implemented by the following three ways:
1) building a blank image, then performing a point-by-point corresponding filling on the pixels of the blank image based on the depth image and according to step S105, finally getting the processed depth image;
2) building a copy image of the depth image, then performing a point-by-point corresponding refresh of the pixels of the copy image based on the depth image and according to step S105, finally getting the processed depth image;
3) performing a point-by-point re-determination of information of processed depth image according to the information of the depth values of pixels of the depth image and according to step S105, and the re-determined information being stored in a memory element such as a RAM, after finish traversing the pixels of the whole depth image, overriding the depth image with the re-determined information stored in the RAM and finally getting the processed depth image.

In the depth image, the surrounding pixels may be located on the inclined direction of the current pixel, such as 30°, 45°, etc. In an embodiment, the surrounding pixels may be located on the cross type direction of the current pixel such that the speed of calculation process can be improved, thereby improving the speed of the de-noising processing on the depth image.

In an embodiment, the set number of loops is five by considering the calculation process speed of a device. The set direction followed by the traversal can be from left to right or from right to left in row, or from up to down or from down to up in column, or the like. In addition, there is no limit to the sequence of reading pixels in the cross type direction, and the reading sequence can be clockwise or anticlockwise. In an embodiment of the present invention, the set direction is from left to right in row, and the reading sequence is right, down, left, and up when reading the depth values of the pixels in the cross type direction centered on the current pixel.

Figure 4:
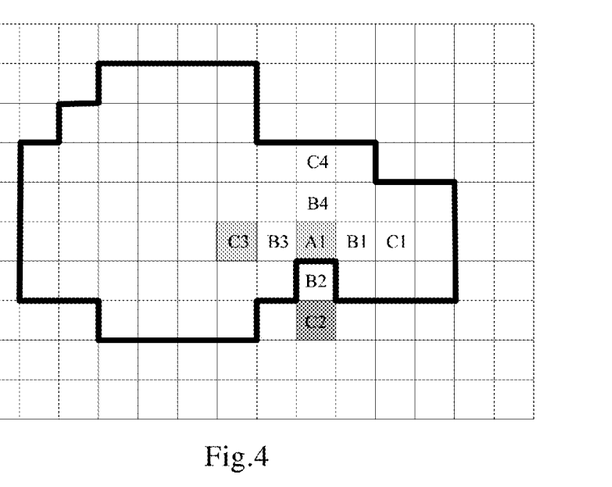
FIG. 4 shows a schematic diagram of a principle of pixel filling in accordance with an embodiment of the present invention.

Specifically, as shown in FIG. 4, each pixel of the depth image gathered by the binocular camera is successively accessed from left to right along the direction of row, and it may continue to access next pixel when the depth value of the current pixel is within the corresponding standard range of depth value for the segmentation unit in which the current pixel is located. It may read the depth values of pixels on the cross type direction centered on the current pixel according to the sequence of right, down, left, and up, and spread outward five times, i.e., reading B1, B2, B3, B4 in the first time, reading C1, C2, C3, C4 in the second time and so on, when the depth value of the current pixel (as A1 pixel shown in the Figure) is beyond the corresponding standard range of depth value for the segmentation unit in which the current pixel is located. In the loop reading procedure, it may quit the loop and adjust the depth value of the current pixel as the depth value of the pixel currently being read, when a pixel currently being read is located in the segmentation unit and its depth value is within the standard range of depth value corresponding to the segmentation unit in which the current pixel is located. As shown in FIG. 4, in the loop reading procedure, C2 is located out of the segmentation unit, thus does not meet the criteria, while C3 is located in the segmentation unit and its depth value is within the standard range of depth value corresponding to the segmentation unit, therefore it may quit the loop after reading C3 and adjust the depth value of A1 as the depth value of C3. If it cannot read the pixel satisfying the above criteria after five times loop, then the depth value of the current pixel can be adjusted as the depth reference value depth (i) corresponding to the segmentation unit in which the current pixel is located.

The above solution can cause the depth value transition within the whole segmentation unit to be relatively smooth, and reduce holes, thereby facilitating the improvement of the quality of the depth image.

Figure 5:
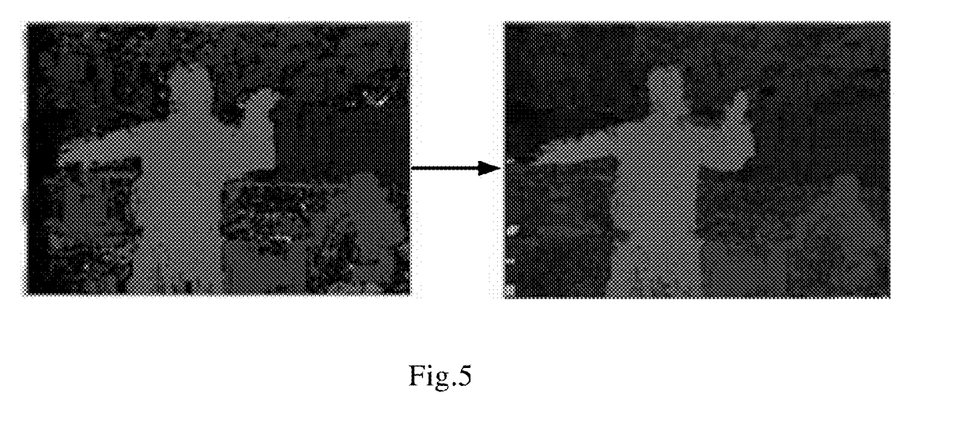
FIG. 5 shows a comparison diagram of a depth image before performing de-noising processing and the depth image after performing de-noising processing in accordance with an embodiment of the present invention.

In the solution of the embodiments of the present invention, it can segment the depth image to obtain a plurality of segmentation units; calculate the corresponding depth reference value and the standard range of depth value for each segmentation unit; then traverse pixels of the depth image and adjust a depth value of a pixel to the standard range of depth value corresponding to the segmentation unit. It can perform de-noising processing on the depth image through this solution, and the contour of the processed depth image is more clear as shown in FIG. 5 and easy to identify. Therefore, it can improve the quality of the depth image obtained by the binocular camera.

Figure 6:
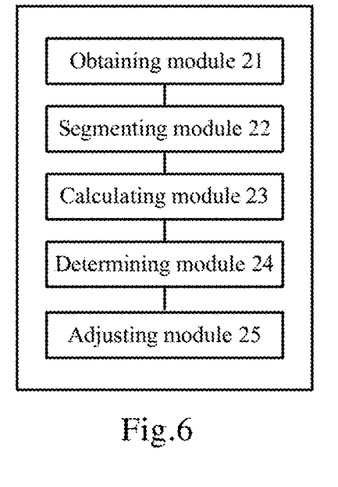
FIG. 6 shows a block diagram of an apparatus for processing a depth image in accordance with an embodiment of the present invention.

Based upon the same inventive concept, there is provided an apparatus for processing a depth image according to an embodiment of the present invention. The apparatus will be described below with reference to FIG. 6. For same parts or functions as described in the previous embodiments, the description thereof is omitted for brevity. Referring to FIG. 6, the apparatus comprises:

an obtaining module 21 configured to obtain the depth image and a captured image corresponding to the depth image;

a segmenting module 22 configured to segment the depth image to obtain a plurality of segmentation units;

a calculating module 23 configured to calculate a corresponding depth reference value for each segmentation unit;

a determining module 24 configured to determine a standard range of depth value for the each segmentation unit based on the corresponding depth reference value; and an adjusting module 25 configured to adjust a depth value of each pixel of the depth image to the standard range of depth value corresponding to the segmentation unit in which the each pixel is located.

In an embodiment, the segmenting module 22 is further configured to perform contour segmentation on the captured image to obtain contour segmentation information; and segment the depth image to obtain the plurality of segmentation units based on the contour segmentation information.

In an embodiment of the present invention, the segmenting module 22 is further configured to: perform gray processing on the captured image to obtain a gray image; perform edge extraction on the gray image to obtain a contour image; perform contour dilation processing on the contour image to obtain a contour dilation image; reverse the contour dilation image to obtain a reversed image; calculate the contour segmentation information of the reversed image using the watershed algorithm.

In an embodiment of the present invention, the calculating module 23 is further configured to remove a black point pixel and a bright point pixel in the segmentation unit; count the numbers of pixels with different depth values for the segmentation unit in which the black point pixel and the bright point pixel have been removed; determine the depth value that the largest number of pixels have as the depth reference value for the segmentation unit.

In an embodiment of the present invention, the standard range of depth value for the each segmentation unit is 0.5~1.3 times the depth reference value.

In an embodiment of the present invention, the adjusting module 25 is further configured to traverse a pixel of the depth image along a set direction, wherein in the traversing procedure, if the depth value of a current pixel is beyond the standard range of depth value corresponding to the segmentation unit of the current pixel, then the depth values of surrounding pixels centering on the current pixel in the depth image may be sequentially read and spread outward the set number of loops; if a pixel currently being read is within the segmentation unit and its depth value is within the standard range of depth value corresponding to the segmentation unit, then it may quit the loop and the depth value of the current pixel is adjusted as the depth value of the pixel currently being read; if the set number of loops is finish and the depth value of the current pixel is not adjusted, then the depth value of the current pixel is adjusted as the depth reference value corresponding to the segmentation unit.

In an embodiment of the present invention, the surrounding pixels are located on the cross type direction of the current pixel.

In an embodiment of the present invention, the set number of loops is five; and the set direction is from left to right or from right to left in row, or from up to down or from down to up in column.

The apparatus for processing the depth image according to the above embodiments of the present invention, can perform de-noising processing on the depth image, and the contour of the processed depth image is more clear and easy to identify. Therefore, it can improve the quality of the depth image.

It is obvious that for those skilled in the art, various modifications and variations can be made without departing from the spirit and the substance of the invention. The above mentioned embodiments are only exemplary and not intend to limit the scope of the present invention, which is defined by the claims.

What is claimed is:

1. A method for processing a depth image, the method comprising:
    obtaining the depth image and a captured image corresponding to the depth image;
    segmenting the depth image to obtain a plurality of segmentation units;
    calculating, for each segmentation unit, a corresponding reference value for a depth of said segmentation unit;
    determining a standard range of depth value for each segmentation unit based on the corresponding reference value; and
    adjusting a depth value of each pixel of the depth image according to the standard range of depth value corresponding to the segmentation unit in which the pixel is located.

2. The method according to claim 1, wherein segmenting the depth image to obtain a plurality of segmentation units comprises:
    performing contour segmentation on the captured image to obtain contour segmentation information; and
    segmenting the depth image to obtain the plurality of segmentation units based on the contour segmentation information.

3. The method according to claim 2, wherein performing contour segmentation on the captured image to obtain contour segmentation information comprises:
    performing gray processing on the captured image to obtain a gray image;
    performing edge extraction on the gray image to obtain a contour image;
    performing contour dilation processing on the contour image to obtain a contour dilation image;
    reversing the contour dilation image to obtain a reversed image; and
    calculating the contour segmentation information of the reversed image using a watershed algorithm.

4. The method according to claim 3, wherein the calculating a corresponding depth reference value for each segmentation unit comprises:
    removing a black point pixel and a bright point pixel in the segmentation unit;
    counting, for each one of different depth values of the segmentation unit in which the black point pixel and the bright point pixel have been removed, the number of pixels having said value; and
    determining the depth value having the largest number of pixels as the reference value for the segmentation unit.

5. The method according to claim 2, wherein calculating a corresponding depth reference value for each segmentation unit comprises:
    removing a black point pixel and a bright point pixel in the segmentation unit;
    counting, for each one of different depth values of the segmentation unit in which the black point pixel and the bright point pixel have been removed, the number of pixels having said value; and
    determining the depth value having the largest number of pixels as the reference value for the segmentation unit.

6. The method according to claim 1, wherein calculating a corresponding depth reference value for each segmentation unit comprises:
    removing a black point pixel and a bright point pixel in the segmentation unit;
    counting, for each one of different depth values of the segmentation unit in which the black point pixel and the bright point pixel have been removed, the number of pixels having said depth value; and
    determining the depth value having the largest number of pixels as the reference value for the segmentation unit.

7. The method according to claim 1, wherein the standard range of depth value for each segmentation unit is 0.5~1.3 times the reference value for said segmentation unit.

8. The method according to claim 1, wherein adjusting a depth value of each pixel of the depth image to the standard range of depth value corresponding to the segmentation unit in which the each pixel is located, comprises:
    traversing a pixel of the depth image along a set direction, wherein in the traversing procedure:
    if the depth value of a current pixel is beyond the standard range of depth value corresponding to the segmentation unit in which the current pixel is located, then the depth values of surrounding pixels centering on the current pixel in the depth image are sequentially read and spread outward a set number of loops;
    if a pixel currently being read is within the segmentation unit and its depth value is within the standard range of depth value corresponding to the segmentation unit, then it may quit the loop and the depth value of the current pixel is adjusted as the depth value of the pixel currently being read; and if the set number of loops is finished and the depth value of the current pixel is not adjusted, then the depth value of the current pixel is adjusted to be the reference value corresponding to the segmentation unit.

9. The method according to claim 8, wherein the surrounding pixels are located on a cross type direction of the current pixel.

10. The method according to claim 9, wherein:
the set number of loops is five; and
the set direction is from left to right or from right to left in a row, or from up to down or from down to up in a column.

11. An apparatus for processing a depth image, the apparatus comprising:
an obtaining module configured to obtain the depth image and a captured image corresponding to the depth image;
a segmenting module configured to segment the depth image to obtain a plurality of segmentation units;
a calculating module configured to calculate, for each segmentation unit, a corresponding reference value for a depth of said segmentation unit;
a determining module configured to determine a standard range of depth value for the each segmentation unit based on the corresponding reference value of said segmentation unit; and
an adjusting module configured to adjust a depth value of each pixel of the depth image according to the standard range of depth value corresponding to the segmentation unit in which the pixel is located.

12. The apparatus according to claim 11, wherein the segmenting module is further configured to:
perform contour segmentation on the captured image to obtain contour segmentation information; and
segment the depth image to obtain the plurality of segmentation units based on the contour segmentation information.

13. The apparatus of according to claim 12, wherein the segmenting module is further configured to:
perform gray processing on the captured image to obtain a gray image;
perform edge extraction on the gray image to obtain a contour image;
perform contour dilation processing on the contour image to obtain a contour dilation image;
reverse the contour dilation image to obtain a reversed image; and
calculate the contour segmentation information of the reversed image using a watershed algorithm.

14. The apparatus according to claim 13, wherein the calculating module is further configured to:
remove a black point pixel and a bright point pixel in the segmentation unit;
count, for each one of different depth values of the segmentation unit in which the black point pixel and the bright point pixel have been removed, the number of pixels having said value; and
determine the depth value having the largest number of pixels as the reference value for the segmentation unit.

15. The apparatus according to claim 12, wherein the calculating module is further configured to:
remove a black point pixel and a bright point pixel in the segmentation unit;
count, for each one of different depth values of the segmentation unit in which the black point pixel and the bright point pixel have been removed, the number of pixels having said value; and
determine the depth value having the largest number of pixels as the reference value for the segmentation unit.

16. The apparatus according to claim 11, wherein the calculating module is further configured to:
remove a black point pixel and a bright point pixel in the segmentation unit;
count, for each one of different depth values of the segmentation unit in which the black point pixel and the bright point pixel have been removed, the number of pixels having said value; and
determine the depth value having the largest number of pixels as the reference value for the segmentation unit.

17. The apparatus according to claim 11, wherein the standard range of depth value for each segmentation unit is 0.5~1.3 times the reference value for said segmentation unit.

18. The apparatus according to claim 11, wherein the adjusting module is further configured to traverse a pixel of the depth image along a set direction, wherein in the traversing procedure:
if the depth value of a current pixel is beyond the standard range of depth value corresponding to the segmentation unit in which the current pixel is located, then the depth values of surrounding pixels centering on the current pixel in the depth image are sequentially read and spread outward a set number of loops;
if a pixel currently being read is within the segmentation unit and its depth value is within the standard range of depth value corresponding to the segmentation unit, then it may quit the loop and the depth value of the current pixel is adjusted as the depth value of the pixel currently being read; and
if the set number of loops is finished and the depth value of the current pixel is not adjusted, then the depth value of the current pixel is adjusted to be the reference value corresponding to the segmentation unit.

19. The apparatus according to claim 18, wherein the surrounding pixels are located on a cross type direction of the current pixel.

20. The apparatus according to claim 19, wherein:
the set number of loops is five; and
the set direction is from left to right or from right to left in a row, or from up to down or from down to up in a column.

* * * * *